United States Patent
Ginocchio

[19]

[11] Patent Number: 6,101,684

[45] Date of Patent: *Aug. 15, 2000

[54] SELF-ALIGNING HANDLING OR STORING DEVICE AND METHODS OF USE THEREFOR

[76] Inventor: Mark H. Ginocchio, 259 Fourth Ave. North, St. Petersburg, Fla. 33701

[ * ] Notice: This patent is subject to a terminal disclaimer.

[21] Appl. No.: 09/247,682

[22] Filed: Feb. 9, 1999

Related U.S. Application Data

[63] Continuation-in-part of application No. PCT/US97/22250, Dec. 4, 1997, which is a continuation-in-part of application No. 08/760,461, Dec. 6, 1996, Pat. No. 5,729,872.

[51] Int. Cl.⁷ .......................... A44B 21/00; B65D 63/00
[52] U.S. Cl. .......................... 24/16 R; 24/20 R; 24/270; 24/543; 24/557
[58] Field of Search .................. 24/16 R, 30.5 R, 24/543, 20 R, 20 TT, 270, 271, 279, 284, 527

[56] References Cited

U.S. PATENT DOCUMENTS

| | | | |
|---|---|---|---|
| 3,310,852 | 3/1967 | Flanders | 24/16 R |
| 3,429,985 | 2/1969 | Czigler | 24/543 |
| 3,530,543 | 9/1970 | Desmarais et al. | 24/16 R |
| 3,574,900 | 4/1971 | Emery | 24/130 |
| 3,654,668 | 4/1972 | Appleton . | |
| 3,660,869 | 5/1972 | Caveney et al. | 24/16 PB |
| 3,910,280 | 10/1975 | Talonn | 128/327 |
| 3,953,911 | 5/1976 | Fishack | 24/16 R |
| 4,123,095 | 10/1978 | Stehlin | 24/270 |
| 4,278,042 | 7/1981 | Lindquist | 114/218 |
| 4,340,998 | 7/1982 | Liberge | 23/130 |
| 4,361,938 | 12/1982 | Emery | 24/130 |
| 4,380,101 | 4/1983 | Joubert et al. | 24/237 |
| 4,483,556 | 11/1984 | Livolsi | 24/16 R |
| 4,511,164 | 4/1985 | Orchard | 24/270 |
| 4,650,925 | 3/1987 | Coldren | 24/543 |
| 4,669,688 | 6/1987 | Itoh et al. | 24/543 |
| 4,870,722 | 10/1989 | Shell, Jr. | 24/16 R |
| 4,956,897 | 9/1990 | Speedie | 24/134 P |
| 4,958,791 | 9/1990 | Nakamura | 248/74.1 |
| 4,991,265 | 2/1991 | Campbell et al. | 24/16 PB |
| 5,056,248 | 10/1991 | Blanchard | 24/543 |
| 5,083,741 | 1/1992 | Sancoff | 24/557 |
| 5,210,911 | 5/1993 | Brown et al. | 24/18 |
| 5,228,174 | 7/1993 | Beasley | 24/28 |
| 5,317,788 | 6/1994 | Esposito et al. | 24/300 |
| 5,349,779 | 9/1994 | Ben-Dror | 24/543 |
| 5,729,872 | 3/1998 | Ginocchio | 24/16 R |

FOREIGN PATENT DOCUMENTS

| | | |
|---|---|---|
| 758160 | 10/1956 | United Kingdom . |
| 1 224 535 | 3/1971 | United Kingdom . |
| 2 139 016 | 4/1984 | United Kingdom . |
| 2 245 639 | 1/1992 | United Kingdom . |

OTHER PUBLICATIONS

Sumitomo Wiring System, Ltd., *Binding Tool for Wire Harness*, Patent Abstracts of Japan, Pub. No. 07122135, Oct. 21, 1993.

*Primary Examiner*—Victor N. Sakran
*Attorney, Agent, or Firm*—Wood,HerronEvans, L.L.P.

[57] ABSTRACT

A device for handling or storing bundled items such as electrical cords or cables is provided by using a handcuff-like element having jaws that self-sustain an open position while the bundled item is inserted therein and which traverse a fixed path or trajectory to close on the bundled item. The device may also be used handling or storing key rings, belts, fabrics such as napkins, jewelry, shopping bags, and plantings, among other applications.

38 Claims, 5 Drawing Sheets

SELF-ALIGNING HANDLING OR STORING DEVICE AND METHODS OF USE THEREFOR

CROSS-REFERENCE TO RELATED APPLICATIONS

This application is a continuation-in-part of previously filed and PCT Application designating the United States Ser. No. PCT/US97/22250, filed Dec. 4, 1997, which is a continuation-in-part of previously filed U.S. patent application Ser. No. 08/760,461, filed Dec. 6, 1996, now U.S. Pat. No. 5,729,872 all of which are hereby incorporated by reference herein in their entirety.

BACKGROUND OF THE INVENTION

I. Field of the Invention

The present invention relates to devices for capturing items, such as for handling or storage of electrical cords or cables or other applications.

II. Description of Prior Art

Handling and/or storage of items has presented numerous challenges, and despite various handling and storage devices that have been devised, several problems continue to be difficult to resolve.

One example is the problem of storage of electrical cords or cables. Many people tend to leave their cords simply in a pile. Such an approach is both unsightly and can be unsafe. Indeed, without better organization of the cords, storage can become a nightmare. One need only consider the PC laptop user trying to untangle the mess of cables from the briefcase in a busy airport.

Typically, wire-ties, tie wraps, cable ties, or twist-ties may be used to store cords in an effort to reduce such problems. However, such items are very difficult to use and require a great deal of manual dexterity. In particular, closing these ties around the bundled cord is quite challenging because the ends are free to go wherever they are pushed. Some of those items, and particularly twist-ties such as are used to close garbage bags, are unsightly, have only a short useful life, and can present a risk of injury due to the metal wire contained therein. Other cable management devices have been proposed, but they are usually quite bulky and again require a great deal of manipulation. By way of example, some cable management devices are molded into a split ring with the ends normally urged together. The ends may be temporarily held apart by the user while a cable is inserted into the device. Such a device is difficult to load with the bundled wire because the ends are normally urged together into a closed or nearly-closed position.

When not attached to a cable or wire, a small wire tie or similar device is easy to lose. Also, such devices are typically designed for limited use, e.g., they cannot be non-destructively removed, or will experience substantial wear (e.g., metal fatigue) if repeatedly opened and closed. Thus, one cannot avoid losing a twist tie or wire tie by attaching it to the unbundled cable, since doing so will require destruction or damage to the twist tie or wire tie. This is a particular drawback in storage of cables which must be repeatedly bundled and unbundled, e.g., extension cords used with hand tools, portable computer cabling, and other similar applications.

Aside from bundles of wires, in various other situations, objects must be wrapped and held for storage, handling or other reasons; often wire ties, twist ties, or lengths of string are used in such situation, with unsatisfactory results for the same reasons as those noted above: difficulty in use, likelihood of loss, and destruction and wear resulting from repeated use.

Accordingly, there is a need for a device that can be readily used in handling and/or storage of bundles of items which can be easily used, has a reduced likelihood of being lost when not in use, and is not subject to destruction and wear from repeated use.

SUMMARY OF THE INVENTION

The present invention provides a device for handling and/or storing items, which is easily used, less subject to loss, destruction and wear. A device in accordance with the principles of the present invention, utilizes a pair of rigid jaws which have a self-sustaining open position and are self-aligned so as to readily close about the item being handled or stored. The rigid jaws may be in the form of a handcuff-like element, or other hinged and self-aligning arrangements. A "rigid" material, for the purposes of this application, does not exclude some resilience, but only requires sufficient rigidity that the ends of the jaw members will self-align when the device is pressed to its closed position. Furthermore, a "rigid" material, for the purposes of this application, may be deformable (which may occur as part of inserting items between the jaws) so long as the material sufficiently returns to its original shape that the ends of the jaw members will self-align.

In the specific embodiments described below, the device includes engaging mechanisms at the outer ends of the jaws which interact to hold the jaws closed in one of several possible positions. These mechanisms may be barbed teeth and a pawl for engaging the teeth. The pawl may be driven by spring force into its engaging position, and must be manually pushed from its engaging position to disengage the outer ends of the jaws. Alternatively, the pawl may be driven by spring force into its disengaging position, in which case a mechanical latch is used to hold the pawl in place in its engaged position; releasing this latch permits the spring force to disengage the pawl. The teeth and the mating pawl may be formed on any opposed surfaces of the jaw ends, e.g., the top, sides or bottoms thereof.

In further embodiments, an engaging mechanism in the hinge axle may be utilized to hold the jaws in a closed position. The jaws may be held together at their hinge ends by a hinge axle or a hinge strap. The device may include a clip so that the device may be attached to the items with which it is used so that the device is not readily lost. Alternatively, or in addition, the device may include an attachment hole or hook so that the device can be hung on a hook, nail or peg, or the owner can tie a string through the hole in order to tie the device to the item with which it is used. The device may include an integral or removable handle facilitating its used particularly in handling heavy items. The device may also be constructed to include indicia surfaces which can carry a product name or an advertisement.

The various embodiments of the device described herein are readily used in various applications, without suffering from the above-mentioned drawbacks of wire ties, twist ties and other known approaches. Applications include storing or handling items such as bundled electrical cords or cables, or other various items such as clothing (e.g., belts, ties, jewelry), keyrings, fabrics (e.g., napkins), shopping bags or other collections of items with handles or loops that can be bundled, plantings, or other numerous other items. The device can also be used for child safety applications or as a personal adornment.

These and other objects of the present invention shall be made apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE DRAWINGS

Figures 1, 2, 3A:
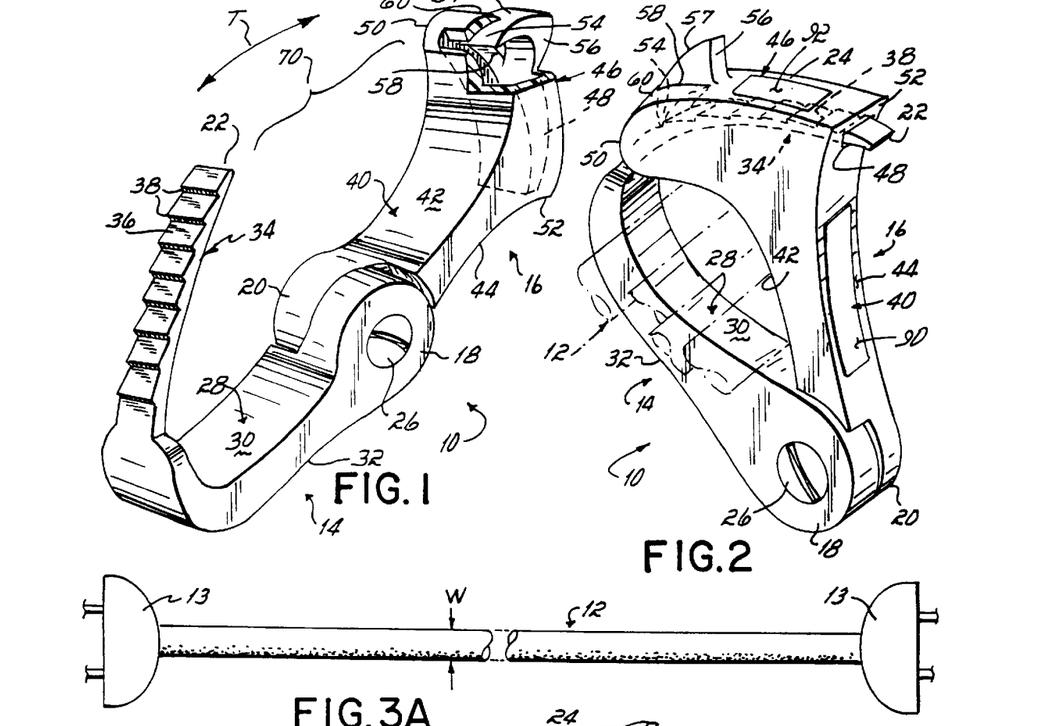
FIG. 1 is a perspective, partially cut-away view of a handcuff-like element in the wide open position to receive a bundled electrical cord in accordance with the method of the present invention.
FIG. 2 is a perspective, partially cut-away view of the handcuff-like element of FIG. 1 in the closed position grasping the bundled electrical cord.
FIGS. 3A–3D are a perspective views of an elongated electrical cord being bundled for purposes of describing the method of the present invention.
Figures 3B, 3C, 3D, 4:
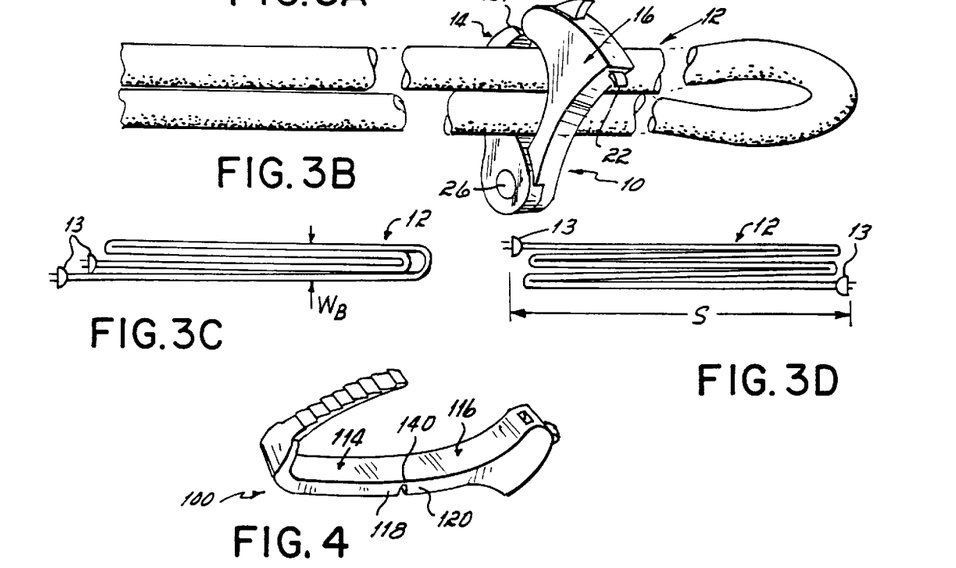
FIG. 4 is a perspective view of an alternative embodiment of a handcuff-like element for use in the method of the present invention.

With reference to FIGS. 1 and 2, there is shown a handcuff-like element 10 which may be used to handle or store an elongated item such as electrical cord or cable 12 (FIG. 3A) which may have connectors or plug elements 13 at opposite ends thereof, and which has been bundled together (FIGS. 3C and 3D). To this end, handcuff-like element 10 includes a pair of generally rigid jaw members 14, 16 each having a proximal hinge end 18, 20, respectively, and a distal attachment end 22, 24, respectively. In the embodiment shown in FIGS. 1 and 2, hinge ends 18, 20 are directly connected together by a rivet 26 which functions as an axle to allow the jaw members 14, 16 to pivot relative one another between the wide open position shown in FIG. 1 and the closed position shown in FIG. 2, as will be readily understood.

The proximal aspect 28 of jaw member 14 has an inner retaining surface 30 and an outer press surface 32 extending from hinge end 18 towards attachment end 22. The distal aspect 34 of jaw member 14 extends from proximal aspect 28 at an angle to give jaw member 14 an overall C-shape. The upper surface 36 of distal aspect 34 of jaw member 14 is serrated with teeth as at 38 for purposes to be described hereinafter. The proximal aspect 40 of jaw member 16 has an inner retaining surface 42 and an outer press surface 44 extending from hinge end 20 towards attachment end 24. The distal aspect of jaw member 16 defines a housing 46 with an arced passageway 48 extending between distal tip 50 and back ledge 52. Extending into passageway 48 is a tang 54 attached to an actuator button 56 resiliently mounted to housing 46 and extending through an aperture 58 in upper surface 60 of housing 46.

In both jaw members 14 and 16, the inner retaining surfaces 30 and 42 have a gentle arc such that in the wide-open position as shown in FIG. 1, almost the entire extent of the inner surfaces are not facing one another, except perhaps adjacent the distal aspects of the respective jaw members.

The generally rigid nature of the jaw members 14, 16, and the function of axle 26 allow the jaw members to operate in certain ways that are advantageous for handling or storing bundled items. To this end, the wide open position shown in FIG. 1 is self-sustaining in that handcuff-like element 10 will retain that wide-open position with the attachment ends spaced well apart to define a bundle-receiving space 70 therebetween, and with the inner retaining surfaces 30 and 42 generally not facing each other as above-described. Rivet 26 pushes confronting surfaces of the hinge ends 18 and 20 together so as to maintain a frictional engagement therebetween thus holding element 10 in the open position. Similarly, the jaw members 14, 16 are self-aligned in that application of pressure to the press surfaces 32 and 44 will cause the jaw members to move together along a generally fixed path or trajectory (as indicated by double-headed arrow T) that effectively insures that attachment end 22 of jaw member 14 will be received into attachment end 24 of jaw member 16 as the jaw members 14,16 are urged together without need for extra manipulation. As jaw members 14,16 continue to be pushed together, attachment 22 engages with attachment end 24 in the closed position shown in FIG. 2 with the inner retaining surfaces 30 and 42 confronting one another.

To facilitate maintaining handcuff-like element 10 in the closed position as shown in FIG. 2, teeth 38, which may be backwardly directed as shown in FIG. 1, cooperate with tang 54 such that as attachment end 22 of jaw member 14 passes into passageway 48, tang 54 rides over teeth 38 and notches therein to generally prevent jaw member 14 from coming loose from attachment end 24 of jaw member 16. Actuating button 56 by pressing on surface 57 thereof causes tang 54 to momentarily lift upwardly relative passageway 48 and out of engagement with teeth 38 to allow handcuff-like element 10 to be opened.

Handcuff-like element 10 may be made of polymer materials such as a durable and resilient plastic (such as ABS), ceramics, metal, or other conventional materials such as wood, or a combination of two or more conventional materials, using conventional manufacturing techniques. Where both metal and plastic are used, the axle (e.g., rivet 26) and tang 54, for example, would be metal with the rest made of plastic.

In use, an elongated item such as an electrical cord 12 is to be stored as a bundle (i.e., with several elongated segments S in overlapped condition) with handcuff-like element 10. To this end, the thickness or width W of item 12 is to be increased many-fold (while the length thereof is greatly decreased) by bundling the item 12 in known fashion. For example, cord 12 may be folded back and forth along itself as indicated in FIGS. 3A–3D, such as by folding the cord in half (FIG. 3B) and then in half again (FIG. 3C). The folding in-half process may be repeated as desired until the cord 12 is a bundle as preferred by the user. Alternatively, short lengths or segments S of cord 12 may be folded over and over into a bundle as exemplified by FIG. 3D, or cord 12 may be coiled around the hand or fingers and then pressed together with the same result. As a consequence, there is formed a bundle having a bundled width $W_B$ many times (e.g., at least 2 although advantageously at least 4 to 8 or more) greater than width W. Bundled cord 12 may be attached to a useable device such as a PC 80 as in FIG. 10, either before or after being bundled, and either before or after being clamped as will now be described.

Jaw members 14, 16 are spread apart into the self-sustaining open position shown in FIG. 1 whereat no further pressure is needed by the user on jaw members 14 or 16 to retain the open position. While handcuff-like element 10 is in that self-sustained open position, the bundle (such as bundled cord 12 of FIG. 3C or FIG. 3D) is inserted into handcuff-like element 10 through bundle-receiving space 70, either by pushing the bundle into element 10, or by passing open element 10 over the bundle. Thereafter, pressure is applied against press surfaces 32 and 44 in conventional fashion to cause jaw members 14, 16 to engage at their attachment ends 22, 24, until inner retaining surfaces 30 and 42 have grasped against bundled item 12 as shown in dotted line in FIG. 2. The bundled cord 12 is thus held in a small compact bundle, even while in use as in FIG. 5, with easy manipulation of a handcuff-like element and without difficult-to-use and unsightly items as provided in the prior art.

Additionally, surfaces 32, 44, and/or 46 are relatively wide and so may be labeled with indicia (as at 90 or 92). These indicia bearing surfaces may be provided with labels bearing advertisements, directions or indicators of the product being clamped (e.g., Christmas lights, extension cord, PC cable, etc.). The labeling may be permanent or temporary and may be applied by embossing, hot stamping, pad printing, stickers, or hand-written with marker.

With reference to FIG. 4, an alternative embodiment of a handcuff-like element 100 is shown which may be used in the method of the present invention. To this end, jaw members 114, 116 are like jaw members 14, 16 except that hinge ends 118 and 120 are not connected together by an axle, but instead are connected together by a hinge strap 140. Handcuff-like element 100 (including hinge strap 140) may be made of the same plastic as handcuff-like element 10 but with less plastic in the hinge strap 140 due to complementary recesses in the hinge ends 118 and 120 of the jaw members 114, 116, so that hinge strap 140 may bend when jaw members 114 and 116 are pivoted together into the closed position (like that shown in FIG. 2).

Figure 5:
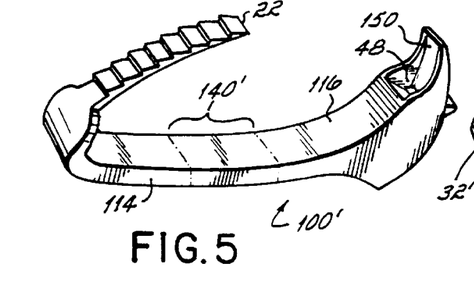
FIG. 5 is a perspective view of a second alternative embodiment of a self-aligning device for handling or storing bundled items.

Alternatively, as shown in FIG. 5, hinge strap 140 could be made from a different grade or type of plastic. In that instance, a rotational press (not shown) may be used wherein two or more different types or grades of plastic are injected into the same cavity into two or more different areas to make an integral product. In this way, most of handcuff-like element 100' may be made of a less flexible plastic, while hinge strap 140' is made of a more flexible plastic. Alternatively, the same plastic may be cured differently so that most of handcuff-like element 100' is less flexible, while hinge strap 140' is more flexible. In this embodiment, complementary recesses need not be included in the area of hinge strap 140' to reduce the amount of plastic in the hinge strap 140', as a more flexible plastic is used in that area permitting flexible closure of the element 100'.

The resiliency/flexibility of strap 140 tends to force jaw members 114,116 into the open position such that handcuff-like element 100 tends to automatically assume an open position (like FIG. 1) when it is not closed. Operation of handcuff-like elements 100 and 100' is otherwise substantially identical to that of handcuff-like element 10.

Due to the potential for slight misalignment of attachment end 22 and passageway 48 when the element 100' of FIG. 5 is closed, the passageway 48 may incorporate a guide area 150 at its opening where attachment end 22 is received. This guide area provides a large opening for receiving attachment end 22, which has beveled sides for guiding attachment end 22 into passageway 48 when element 100' is closed about a bundle. A similar or alternate guide area may be used in this or the other embodiments of the present invention shown in other Figs.

Figure 6:
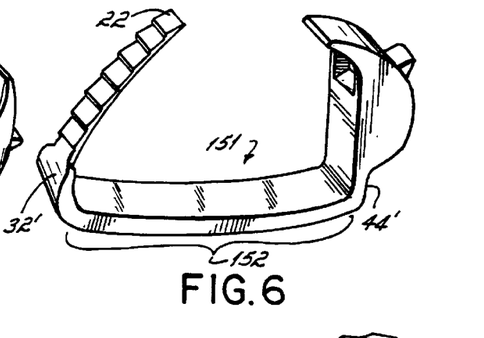
FIG. 6 is a perspective view of a third alternative embodiment of a self-aligning device for handling or storing bundled items.

Referring to FIG. 6, in still another embodiment of the invention, an alternative element 151 includes a region 152 of a sufficiently resilient plastic or other material that the entirety of region 152 will bow into a curved shape when finger pressure is applied to the outer press surfaces 32' and 44' of element 151. Here again, any slight misalignment between attachment end 22 and passageway 48 when element 151 is brought to a closed position, is corrected by guide area 150 which guides attachment end 22 into passageway 48.

Figures 7, 8, 9, 10:
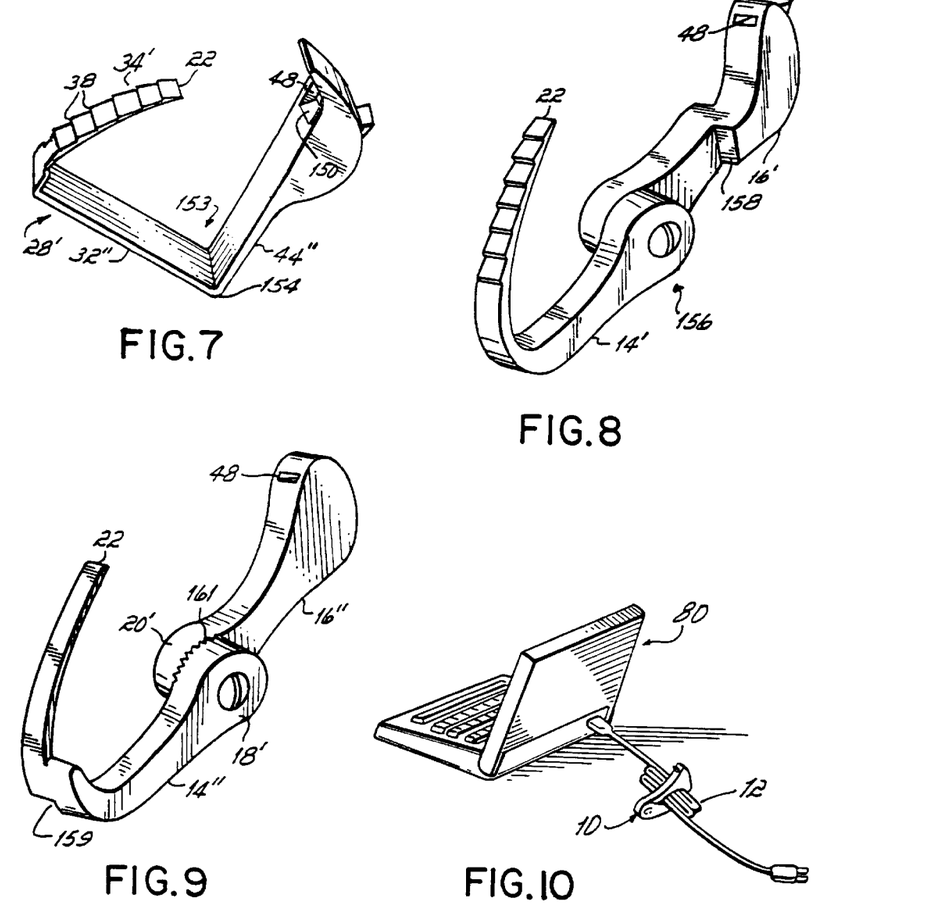
FIG. 7 is a perspective view of a fourth alternative embodiment of a self-aligning device for handling or storing bundled items.
FIG. 8 is a perspective view of a fifth alternative embodiment of a self-aligning device for handling or storing bundled items.
FIG. 9 is a perspective view of a sixth alternative embodiment of a self-aligning device for handling or storing bundled items.
FIG. 10 is a perspective view of the handcuff-like element of FIG. 1 bundled and in use.

Referring to FIG. 7, in a further embodiment, element 153 is formed with a crease 154 in its center section, providing an area of greater flexibility in the molded plastic structure such that when force is applied to outer press surfaces 32" and 44", element 153 bends about crease 154, causing attachment end 22 to self-align and insert into passageway 48. Here again, a guide area 150 is included in passageway 48. It will be noted that a curve, rather than a right angle bend, may be formed at the junction between the distal aspect 34' and proximal aspect 28' of the jaw member shown in FIG. 7. Moreover, teeth 38 may be formed over a longer distance, for example, along the entire length from attachment end 22 throughout press surface 32" to crease 154, permitting a wider range of adjustment when the jaw members are in their closed position. Furthermore, crease 154 may be located at any point between attachment end 22 and passageway 48, so long as end 22 and passageway 48 self-align when end 22 and passageway 48 are pressed together toward each other, potentially further increasing the range of adjustment.

In the embodiments of the invention shown in FIGS. 1 and 2, complementary recesses are formed in jaw members 14 and 16. Referring to FIGS. 8 and 9, in further embodiments of a handcuff-like element 156 similar to element 10 shown in FIGS. 1 and 2, only one such recess 158 need be formed in one of jaw members 14' or 14" and 16' or 16". In FIG. 8, a recess is formed on jaw member 16', of sufficient dimensions to align attachment end 22 with passageway 48. In FIG. 9, a recess 159 is formed on jaw member 14", of sufficient dimensions to align attachment end 22 with passageway 48. Notably, no complementary recesses are formed in jaw member 14' of FIG. 8 or jaw member 16" of FIG. 9, as the dimensions of recesses 158 and 159 are sufficient to align attachment end 22 with passageway 48.

Referring particularly to FIG. 9, it can be seen that the engagement between the jaw members 14" and 16" may be maintained by structure formed at the hinged interface between those members, rather than by structure formed at the outer ends of those members. Specifically, as seen in FIG. 9, jaw members 14" and 16" may include mating knurled teeth 161 at their hinged ends 18" and 20", so that jaw members 14" and 16" frictionally engage with a force sufficient to hold members 14" and 16" engaged together tightly about a bundle. The frictional engagement between members 14" and 16" can be overcome by manual force applied to members 14" and 16", causing knurled teeth 161 to slide past one another and permit the jaws to close or open. It will be appreciated that a similar frictional engagement at the hinged ends 18 and 20 of the handcuff-like element can be used in any of the embodiments and Figs. discussed herein. Furthermore, other frictional engagement structures, such as a mechanical rachet, could also be used at the hinged connection between the jaw members in any of the embodiments and Figs. discussed herein. Also, the surfaces at the hinged ends 18 and 20 of the jaw members may be relatively smooth, but held together tightly by the rivet 26 so that a substantial static friction is generated between the two, thus holding the members in their closed or open position once manually moved to that position.

It will be appreciated that the structure which retains the jaw members (14, 16) in engagement, may or may not be releaseable. In applications where the disclosed structures will be used relatively permanently (e.g., in electronics manufacturing), a releaseable engagement is not necessary, and thus non-releasable structures may be used, e.g., actuator button 56 for releasing tang 54 in the retaining structure shown in FIGS. 1, 2, 4, 5, 6, 7 and 8, may be eliminated, possibly reducing the cost of manufacture. Other non-releaseable mechanical or frictional engagement structures can also be used.

Figures 11, 12:
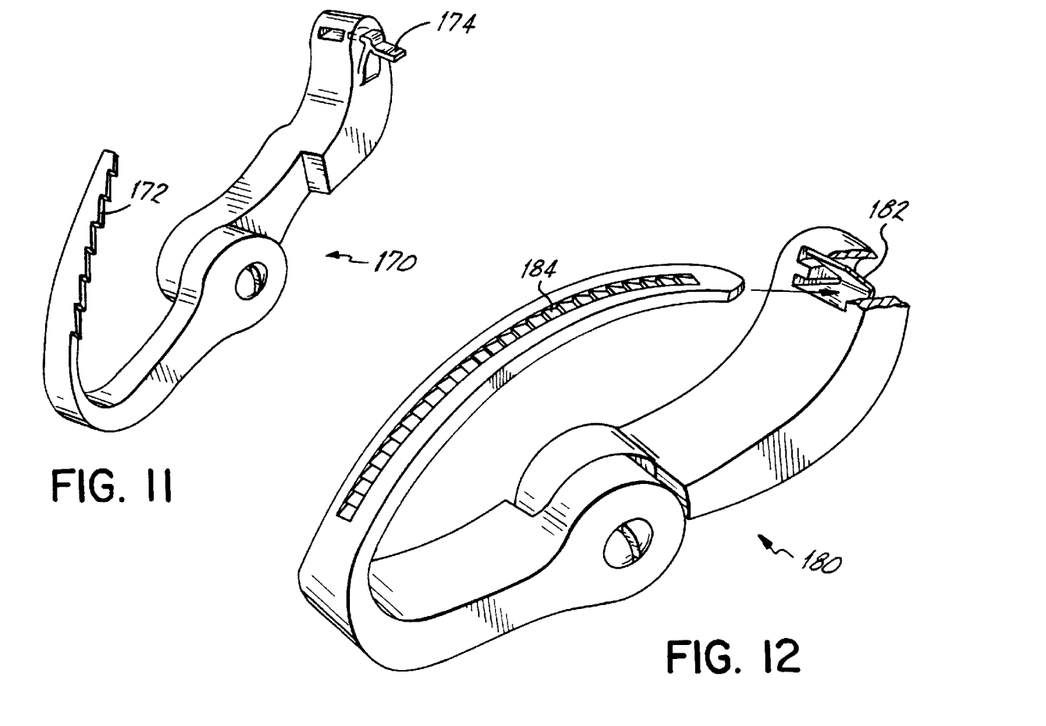
FIG. 11 is a perspective view of a seventh alternative embodiment of a self-aligning device for handling or storing bundled items.
FIG. 12 is a perspective view of an eighth alternative embodiment of a self-aligning device for handling or storing bundled items.

Referring now to FIG. 11, in a seventh alternative embodiment of a self-aligning device 170 for handling or storing bundled items, the teeth 172 on one of the jaw members are positioned on the side of the jaw member and the tang 174 that holds the jaw members in engagement is formed in the side of an opposite jaw member. In this embodiment the tang and the jaw member are formed as a one-piece construction. The 174 tang is molded to engage the teeth 172 when in its rest position. Spring force urging the tang into engagement with the teeth on the opposite jaw member is created by the resilience of the plastic material used to mold the jaw member.

Referring now to FIG. 12, in an eighth alternative embodiment of a self-aligning device 180 for handling or storing bundled items, the tang 182 is formed internally of an end of a jaw member such as is commonly done in conventional wire-ties. In this embodiment, the teeth 184 on the opposite jaw member cannot be readily removed from the tang 182 once engaged.

Figure 13:
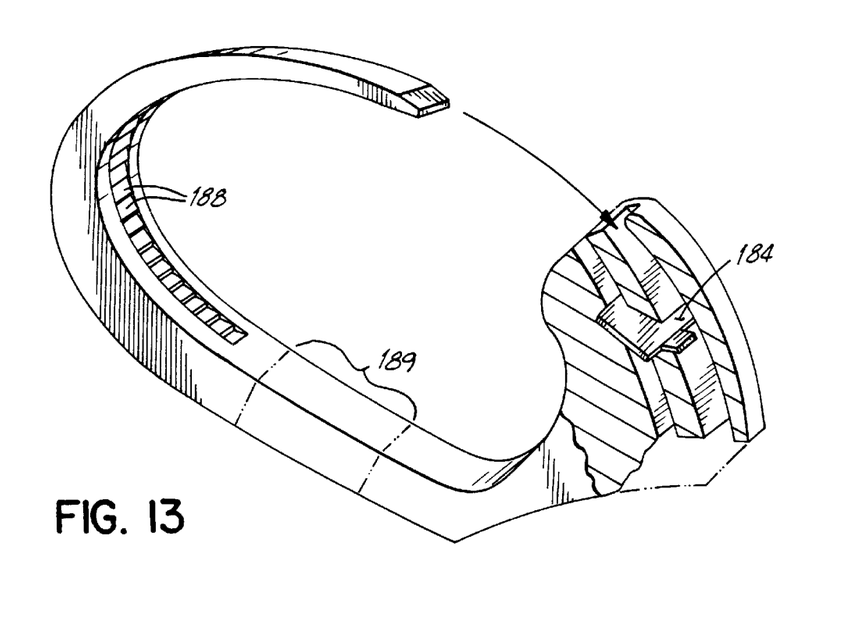
FIG. 13 is a perspective view of a ninth alternative embodiment of a self-aligning device for handling or storing bundled items.

Referring to FIG. 13, in a ninth alternative embodiment of a self-aligning device 186 for handling or storing bundled items, the tang 187 similarly is formed internally of an end of a jaw member such as is commonly done in conventional wire-ties. However, in this embodiment, the teeth 188 are on the inner surface of the opposite jaw member, and the tang 187 is oriented to engage the teeth on the inner surface rather than the outer surface. It will be appreciated that this embodiment cannot be readily removed once closed about an object. In this embodiment, the jaw members are connected together by a hinge strap 189. Hinge strap 189 could be made from a different grade or type of plastic. In that instance, a rotational press (not shown) may be used wherein two or more different types or grades of plastic are injected into the same cavity into two or more different areas to make an integral product. In this way, most of the jaw members, may be made of a less flexible plastic, while hinge strap 189 is made of a more flexible plastic. Alternatively, the same plastic may be cured differently so that most of jaw members are less flexible, while hinge strap 189 is more flexible.

Figures 14, 15:
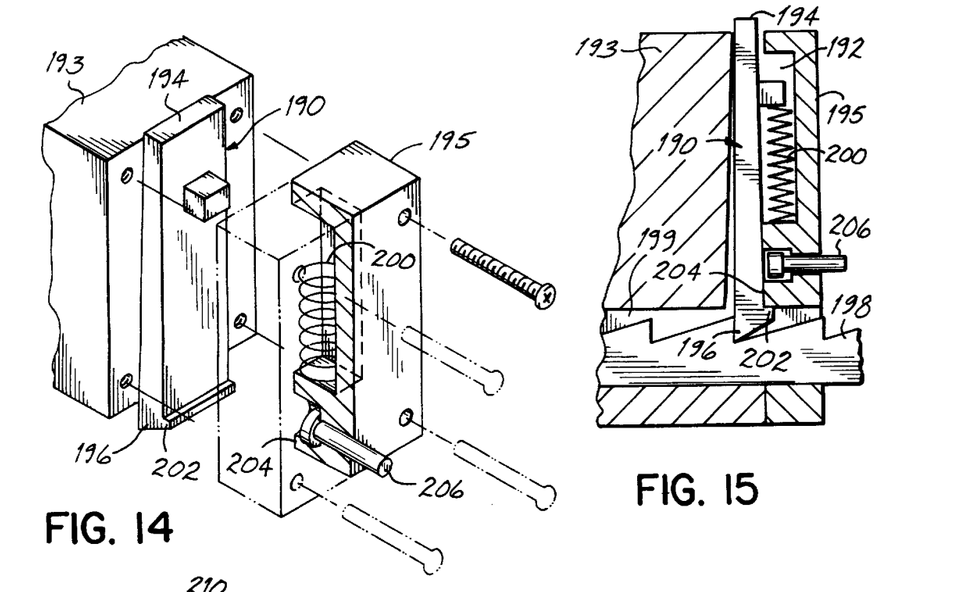
FIGS. 14 and 15 are cutaway perspective and cross sectional views of an alternative tang mechanism.

Various engagement mechanisms can be used on the ends of the jaw members. Referring now to FIGS. 14 and 15, in one alternative mechanism, the tang 196 is formed at the end of a mechanical slider 190. Slider 190 moves within a channel 192 at an end of one of the jaw members. Channel 192 is formed between an outer end of one jaw member 193 and an end cap 195 mounted thereto. Slider 190 is sized such that when tang 196 is disengaged with the teeth on the mating jaw member 198, upper end 194 of slider 190 extends outward from the jaw member. The jaw member includes a channel 199 through which the mating jaw member 198 passes when the device is in its closed position. When slider 190 is inserted fully into channel 192, as seen in FIG. 14, the end of the slider 190 carrying tang 196 passes into channel 199 and engages with teeth of the mating jaw member 198.

Slider 190 defines a latch 202 on its lower end. When slider 190 is fully inserted into channel 192, latch 202 will catch on an upper wall surface 204 of channel 199. A spring 200 captured within channel 192 generates spring force driving slider 190 toward its disengaged position. Spring 200 also generates a torque tending to rotate slider 190 to facilitate engagement between latch 202 and upper wall surface 204 of channel 199.

A release button 206 included within the engagement mechanism can be utilized to disengage latch 202 from upper wall surface 204, and thereby cause slider 190 to move upward to its disengaged position shown in FIG. 14 due to spring force generated by spring 200.

In use, slider 190 is placed in its disengaged position by pressing release button 206 if necessary. Next, the mating jaw element 198 is passed through channel 199 until it reaches the desired position. Then the upper end 194 of slider 190 is pressed until latch 202 engages to the upper wall surface 204, holding slider 190 in its engaged position. To release, button 206 is pressed, causing spring 200 to push slider 190 to its disengaged position.

Figure 16:
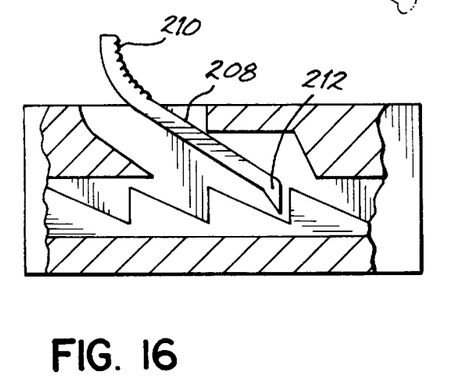
FIG. 16 is a cross sectional view of a second alternative tang mechanism.

FIG. 16 illustrates a second alternative engagement mechanism. In this mechanism, a rotatable element 208 is molded into an end of a jaw element. Element 208 has, on an outer end, a pressure surface 210, and has, on an inner end, a tang 212 for engaging teeth on the opposite jaw element. Element 208 is molded such that in an unstressed condition tang 212 will engage the teeth of the opposite jaw element. By pressing on pressure surface 210, element 208 will be rotated, bringing tang 212 out of engagement and releasing the opposite jaw element.

It will be appreciated that a device in accordance with the present invention can incorporate additional features to facilitate use. For example, a device 214 in accordance with principles of the present invention may incorporate an integral clip 217 on the side of a jaw member as seen in FIG. 17, allowing the device to be clipped to an electrical cord or other item.

Figure 17:
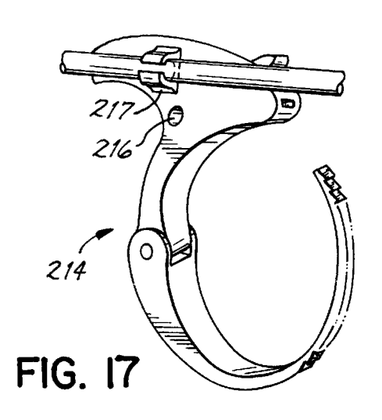
FIGS. 17 and 18 are perspective views of embodiments of the invention incorporating a clip or slot.

As further illustrated in FIG. 17, the device 214 may have a hole 216, so that the device can be hung on a hook, or a string or shock cord can be used to tie the device 214 down or tie the device 214 to the item(s) with which it will be used.

Figure 18:
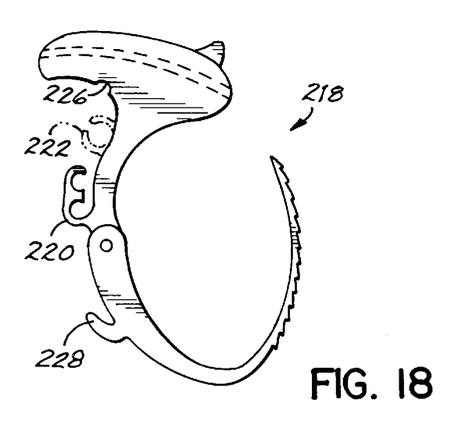

Clips can take various forms or be in various positions. As seen in FIG. 18, in an alternative device 218 one of the jaw members has a dual clip 220 on its outer surface. Alternatively, as shown in shadow on FIG. 18, a single clip can be formed in another position on the outer surface of a jaw member. Alternatively, or in addition, as seen in FIG. 18, the device may have a slot 226 in a jaw member, allowing the device to be clipped to an electrical cord of other item. Slot 226 as shown is C-shaped in cross section, but could also have other shapes such as a T-shaped cross section. Furthermore, one of the jaw members may have a hook or hanger 228.

Furthermore, as seen in FIGS. 19–24, an alternative device 230 may further include a handle 232 to facilitate handling of items captured between the jaw members. Handle 232 may be integral to the device or removable.

Although the bundled item (12) is shown in the preceding figures as a single elongated item folded over upon itself, it will be appreciated that a bundle could alternatively refer to a plurality of separate, typically but not necessarily elongated items held together as a bundle. Furthermore, a flat object such as a cloth napkin may be bundled and handled or stored by gathering the flat object together into a bundle and capturing the bundle in the same manner as a bundled electrical cord. Consequently, whether multiple overlying segments of one item define the bundle or multiple items define the bundle, each of which would appear as in FIG. 2, the result is a bundle that has a width or thickness substantially greater than any one item in the bundle.

Figure 19:
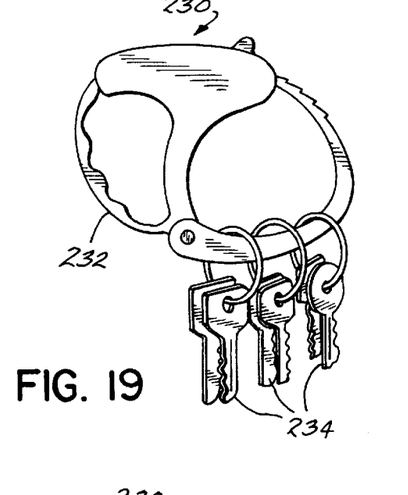
FIGS. 19, 20, 21, 22, 23 and 24 are perspective views of an embodiment of the invention incorporating a handle, used in handling or storing key rings, belts, fabrics such as napkins, jewelry, shopping bags, and plantings.
Figure 20:
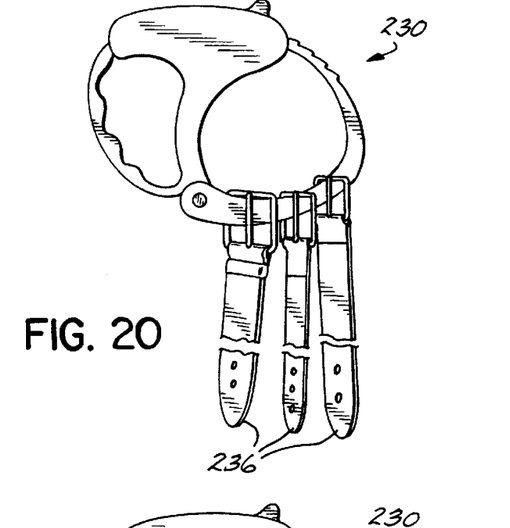
Figure 21:
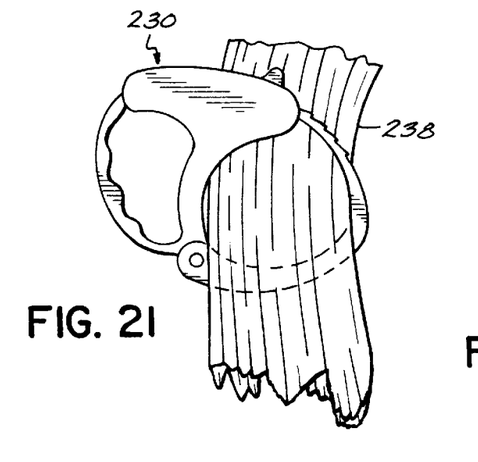
Figure 22:
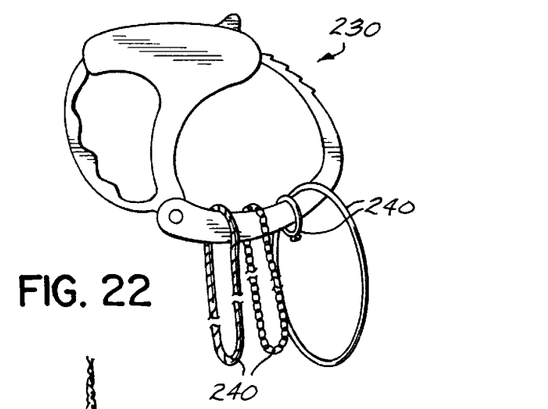
Figure 23:
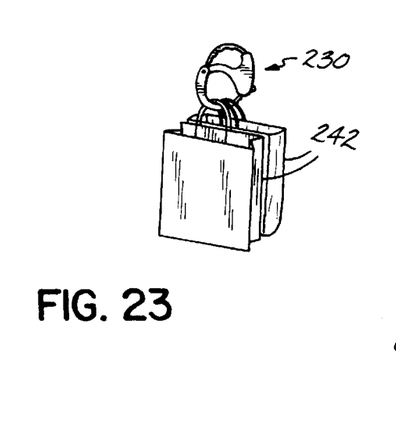
Figure 24:
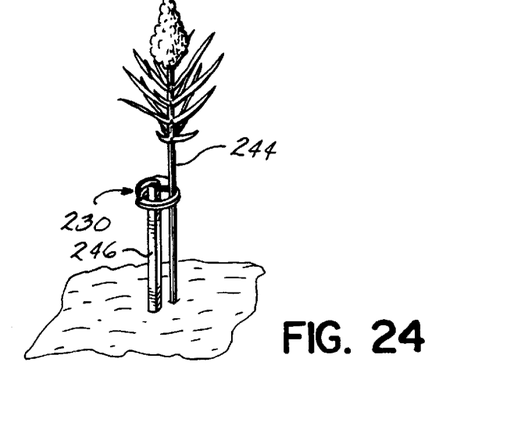

Several applications are possible. As seen in FIG. 19, the device 130 may be used in handling or storing a bundle of key rings each carrying one or more keys 234, by passing one of the jaw members through the key rings. As seen in FIG. 20, the device 130 may similarly be used to handle or store a bundle of belts 236 by passing one of the jaw members through the belt buckles. FIG. 21 illustrates the device 130 used to handle or store bundled fabric 238, which may be clothing or other fabrics such as a napkin. FIG. 22 illustrates the device 130 used to store or handle items of jewelry 240 by passing one of the jaw members through each item of jewelry. As seen in FIG. 23, the device 10 may also facilitate carrying bags such as handled shopping bags 242, by passing one of the jaw members through the gathered bag handles. The device may also be used to cinch closed the gathered top of a bag or sack such as a laundry bag, garbage bag, or food (e.g. potato chip) bag, mail bag, garden product bag in the manner in which twist ties are presently used. As seen in FIG. 24, the device 130 may further be used to gather a planting 244, e.g. by wrapping the device around a gathered planting 244 and supporting stake 246. Alternatively, the device may be used in training a planting by binding two parts of the planting together.

Further, the device may be used in mending a break in a planting or in grafting plantings by closing the device about the broken planting in the area of the break or about the grafted plantings in the area of the graft. As a further alternative, the device may be used as a child safety device, e.g., by using the device to bundle together the handles of a cabinet door, or otherwise bundle together objects so that they cannot be unbundled by a child. The device may also be worn as a jewelry or a similar personal adornment, e.g., by closing the device about body parts or clothing worn on the body, or both, so that the device is visible.

Additionally, various structural changes are possible. For example, serrated teeth and the tang may be replaced with other cooperating latch elements as will be apparent. Similarly, less pronounced, or a different number of teeth may be employed. So, too, rivet 26 may be replaced with a screw or self attaching clip or the like. In the element 100, hinge strap 140 may be formed by ultrasonically welding jaw members 114, 116 together at their hinge ends. Further, handcuff-like element 10 may be provided with a spring loaded hinge and/or locking device (both not shown) to assist in keeping the jaw members 14, 16 in the open position without external pressure as is accomplished with hinge strap 140 of element 100. Also, the handcuff-like element may be manufactured separately from the bundled item with which it is used, or may be attached to the item with which it is to be used, e.g., the handcuff-like element may be permanently attached by a strap or string to an electrical cord for use in bundling the electrical cord, or may be partially or wholly formed as part of the object being bundled, e.g., partially formed in the plug of an electrical cord.

While the present invention has been illustrated by the description of embodiments of the invention, and while the embodiments have been described in considerable detail, it is not the intention of applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having described the invention, what is claimed is:

1. A device for handling or storing one or more items, comprising:

a pair of generally rigid jaw members of material selected from a group consisting of polymer and ceramic material, each having a hinge end and an outer end, the jaw members comprising a mechanical latch to maintain said outer ends in an engaged position, each jaw member including an inner retaining surface and an outer press surface extending between the ends of the jaw member, the jaw members being connected together at their hinge ends, such that the jaw members (i) have a first, self-sustaining open position in which the outer ends are spaced apart to define a receiving space and the inner retaining surfaces are generally not facing one another whereby the one or more items pass into and between the jaw members without requiring external pressure to maintain the jaw members in the open position, (ii) have a plurality of second, closed positions in which the outer ends are engaged and the inner retaining surfaces are in confronting relationship, and (iii) are self-aligned such that the outer ends automatically engage together upon applying pressure on the outer press surfaces.

2. The device of claim 1 wherein said jaw members are of plastic material.

3. The device of claim 1 wherein one of said jaw members is integrally attached to an item that is handled or stored, the outer press surface of the jaw member that is integrally attached to said item being a surface of said item.

4. The device of claim 1 further comprising an axle connecting said jaw members together.

5. The device of claim 1 further comprising a hinge strap connecting the jaw members together.

6. The device of claim 1 wherein at least one jaw member has an indicia surface, and further comprising a label applied to the indicia surface.

7. The device of claim 1 wherein said latch comprises an engaging mechanism at the outer ends of the jaw members.

8. The device of claim 7 wherein the engaging mechanism comprises barbed teeth on a first one of said jaw members and a pawl for engaging the teeth on a second one of said jaw members.

9. The device of claim 8 wherein the pawl has an engaging position and a disengaging position.

10. The device of claim 9 wherein the pawl is driven by spring force into its engaging position, and must be manually pushed from its engaging position to its disengaging position.

11. The device of claim 9 wherein the pawl is driven by spring force into its disengaging position, and further comprising a second mechanical latch coupled to the pawl to hold the pawl in its engaged position.

12. The device of claim 8 wherein said teeth and pawl are formed on said outer press surfaces of said jaw members.

13. The device of claim 8 wherein said teeth and pawl are formed on side surfaces of said jaw members.

14. The device of claim 8 wherein said teeth and pawl are formed on said inner retaining surfaces of said jaw members.

15. The device of claim 1 wherein said latch comprises an engaging mechanism at the hinge end of the jaw members.

16. The device of claim 15 wherein the engaging mechanism comprises mating teeth in said jaw members at their hinge ends.

17. The device of claim 15 wherein the engaging mechanism comprises abutting frictional surfaces on said jaw members at their hinge ends.

18. The device of claim 1 wherein one of said jaw members further comprises a clip attachable to an object.

19. The device of claim 1 wherein one of said jaw members further comprises a hook.

20. The device of claim 1 wherein one of said jaw members defines a slot attachable to an object.

21. The device of claim 1 wherein one of said jaw members defines an attachment hole.

22. The device of claim 1 wherein one of said jaw members further comprises a handle.

23. A method of using a device for handling or storing one or more items, the device having a pair of generally rigid jaws, each jaw having a hinge end and an outer end with an inner retaining surface and an outer press surface extending between the ends of the jaw, the jaws being connected together at their hinge ends, such that the device (i) has a first, self-sustaining open position in which the outer ends are spaced apart with the inner retaining surfaces generally not facing one another, (ii) has a plurality of second, closed positions in which the outer ends are engaged and the inner retaining surfaces are in confronting relationship, and (iii) jaws are self-aligned such that the outer ends automatically engage together upon applying pressure on the outer press surfaces, the method comprising:

placing the jaws of the device into the open position whereby that position is sustained without requiring external pressure to the jaws;

passing the one or more items through a space defined between the outer ends in the open position of the device; and placing the device into one of the plurality of closed positions with the one or more items therein by applying pressure on the outer press surfaces of the jaws until the inner retaining surfaces surround the one or more items.

24. The method of claim 23 adapted for handling or storing one or more items, further comprising bundling the one or more items such that the width of the bundle is greater than the width of any one item in the bundle, and passing the bundled item through the space defined by the outer ends in the open position of the device.

25. The method of claim 23 adapted for handling or storing clothing, further comprising gathering said clothing together and passing the gathered clothing through the space defined by the outer ends in the open position of the device.

26. The method of claim 25 adapted to handling or storing accessory clothing including one or more of belts, socks, hosiery, underwear, scarves, ties, and jewelry.

27. The method of claim 25 adapted to handling or storing belts, further comprising passing one of said jaw members through buckles of said belts and then placing the device into one of the plurality of closed positions.

28. The method of claim 23 adapted to handling or storing keyrings, further comprising passing one of said jaw members through said keyrings and then placing the device into one of the plurality of closed positions.

29. The method of claim 23 adapted to handling or storing fabric, further comprising gathering said fabric and passing the gathered fabric through the space defined by the outer ends in the open position of the device.

30. The method of claim 23 adapted to handling or storing one or more bags, further comprising cinching closed a gathered top of the one or more bags.

31. The method of claim 23 adapted to handling or storing one or more bags, further comprising passing one of said jaw members through handles for said one or more bags and then placing the device into one of the plurality of closed positions.

32. The method of claim 23 adapted to handling or storing plantings, further comprising passing said planting through the space defined by the outer ends in the open position of the device, and then placing the device in one of the plurality of closed positions around the planting.

33. The method of claim 32 used in mending a break in a planting, comprising passing the planting through the space defined by the outer ends in the open position of the device, and then placing the device in one of the plurality closed positions around the planting in the area of the break.

34. The method of claim 23 used in training a planting, further comprising passing two parts of said planting through the space defined by the outer ends in the open position of the device, and then placing the device in one of the plurality of closed positions around the two parts of said planting.

35. The method of claim 23 used in grafting two plantings, further comprising passing at least one of said plantings through the space defined by the outer ends in the open position of the device, and then placing the device in one of the plurality of closed positions around the plantings in the area of the graft.

36. The method of claim 23 adapted to promote child safety, wherein one or more items that a child should not unbundle or separate are passed through the space defined between the outer ends in the open position of the device.

37. The method of claim 36 wherein the items that a child should not separate are the handles of adjacent cabinet doors, and the doors are placed in a closed position prior to closing the device around the handles.

38. The method of claim 23 adapted to personal adornment, wherein the items are parts of a person's body or clothing worn on the person, and the device is placed in one of the plurality of closed positions so as to be visible on the person's body or clothing.

* * * * *

UNITED STATES PATENT AND TRADEMARK OFFICE
CERTIFICATE OF CORRECTION

| | |
|---|---|
| PATENT NO. | : 6,101,684 |
| APPLICATION NO. | : 09/247682 |
| DATED | : August 15, 2000 |
| INVENTOR(S) | : Mark H. Ginocchio |

Page 1 of 1

It is certified that error appears in the above-identified patent and that said Letters Patent is hereby corrected as shown below:

Column 1,
Line 7, after "and", insert -- and copending U.S. Patent Application Serial No. 09/246,314, filed February 9, 1999, and a continuation-in-part of previously filed --.

Column 2,
Line 52, delete "its used", insert -- its use --.

Column 3,
Line 18, delete "are a perspective", insert -- are perspective --.

Column 4,
Line 25, delete "an arced", insert -- an arched --.

Column 9,
Line 22, delete "of other", insert -- or other --.

Signed and Sealed this

Twenty-seventh Day of June, 2006

JON W. DUDAS
*Director of the United States Patent and Trademark Office*

(12) EX PARTE REEXAMINATION CERTIFICATE (7515th)
United States Patent
Ginocchio (10) Number: US 6,101,684 C1
(45) Certificate Issued: May 18, 2010

(54) SELF-ALIGNING HANDLING OR STORING DEVICE AND METHODS OF USE THEREFOR

(76) Inventor: Mark H. Ginocchio, 259 Fourth Ave. North, St. Petersburg, FL (US) 33701

Reexamination Request:
No. 90/010,309, Oct. 5, 2008

Reexamination Certificate for:
Patent No.: 6,101,684
Issued: Aug. 15, 2000
Appl. No.: 09/247,682
Filed: Feb. 9, 1999

Certificate of Correction issued Jun. 27, 2006.

Related U.S. Application Data

(63) Continuation-in-part of application No. 09/246,314, filed on Feb. 8, 1999, now abandoned, which is a continuation-in-part of application No. PCT/US97/22250, filed on Dec. 4, 1997, said application No. 09/247,682, is a continuation-in-part of application No. 08/760,461, filed on Dec. 6, 1996, now Pat. No. 5,729,872.

(51) Int. Cl.
*A44B 99/00* (2006.01)
*A65D 63/00* (2006.01)

(52) U.S. Cl. .................. 24/16 R; 24/20 R; 24/270; 24/543; 24/557

(58) Field of Classification Search .................. 24/16 R, 24/20 R, 270, 543, 557
See application file for complete search history.

(56) References Cited

U.S. PATENT DOCUMENTS

| | | | |
|---|---|---|---|
| 766,263 A | 8/1904 | Judd | |
| 930,014 A | 8/1909 | Wood | |
| 3,429,985 A | 2/1969 | Czigler | |
| 5,293,669 A | 3/1994 | Sampson | |
| 5,363,538 A | 11/1994 | Arrendiell et al. | |
| 5,677,513 A | 10/1997 | Ito et al. | |
| 6,619,077 B1 | 9/2003 | Robinson | |
| 6,742,223 B1 | 6/2004 | Chang | |

FOREIGN PATENT DOCUMENTS

| | | |
|---|---|---|
| JP | 34-1164 | 3/1931 |
| JP | 56-9681 | 7/1954 |
| JP | 60-87485 | 6/1985 |
| JP | 60-177050 | 11/1985 |
| JP | 5-32824 | 4/1993 |
| JP | 5-55864 | 5/1993 |
| JP | 5-83924 | 11/1993 |
| JP | 5-85078 | 11/1993 |
| JP | 3001914 | 6/1994 |
| JP | 7122135 | 10/1997 |

OTHER PUBLICATIONS

Japanese Abstract, JP7122135, Sumitomo Wiring Syst Ltd, May 12, 1995.

*Primary Examiner*—Matthew C. Graham (57) ABSTRACT

A device for handling or storing bundled items such as electrical cords or cables is provided by using a handcuff-like element having jaws that self-sustain an open position while the bundled item is inserted therein and which traverse a fixed path or trajectory to close on the bundled item. The device may also be used handling or storing key rings, belts, fabrics such as napkins, jewelry, shopping bags, and plantings, among other applications.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–38 is confirmed.

New claims 39–46 are added and determined to be patentable.

*39. The device of claim 1 wherein said mechanical latch is releasable by pressure upon a surface of one said jaw member.*

*40. The device of claim 1 wherein said jaw members are frictionally engaged at their hinge ends such that the jaw members will be held in the self-sustaining open position.*

*41. The device of claim 40 wherein the frictional engagement between said jaw members may be overcome by the application of external pressure upon the jaw members.*

*42. The method of claim 23 wherein said jaw members include a mechanical latch to maintain said jaw members in an engaged position.*

*43. The method of claim 42 wherein said mechanical latch is releasable by pressure upon a surface of one said jaw member.*

*44. The method of claim 42 further comprising applying pressure to said surface to release said latch elements and place the jaw members into the open position.*

*45. The method of claim 23 wherein said jaw members are frictionally engaged at their hinge ends such that jaw members will be held in the self-sustaining open position.*

*46. The method of claim 45 wherein the step of applying pressure on the outer press surfaces overcomes frictional engagement between said jaw members.*

\* \* \* \* \*